W. S. JONES.
WATER MOTOR.
APPLICATION FILED OCT. 28, 1918.

1,306,487.

Patented June 10, 1919.

Inventor
Walter S. Jones
By his Attorney

UNITED STATES PATENT OFFICE.

WALTER S. JONES, OF NEW YORK, N. Y.

WATER-MOTOR.

1,306,487. Specification of Letters Patent. Patented June 10, 1919.

Application filed October 28, 1918. Serial No. 259,927.

*To all whom it may concern:*

Be it known that I, WALTER S. JONES, a citizen of the United States, residing in the city, county, and State of New York, have invented or discovered certain new and useful Improvements in Water-Motors, of which the following is a full, clear, and complete description.

My invention relates to water-motors having a tangentially directed inlet and axial outlet, and more especially to a motor of the type just mentioned designed for domestic purposes.

The principal object of my invention is to provide a water-motor which shall be cheap to build, but which shall be capable of developing high torque in proportion to the amount of water used over a wide range of speed.

A further object of my invention is to provide a simple and rugged motor which shall be capable of developing high torque when fed from a single faucet of the ordinary city supply.

Other objects of my invention are to produce a light weight motor of good efficiency and to provide a light, simple, and rugged motor of high torque which shall be particularly convenient for household use.

In the drawing accompanying and forming a part of this application, I have shown a water-motor embodying my invention in one of its forms.

In said drawing

Figure 1:
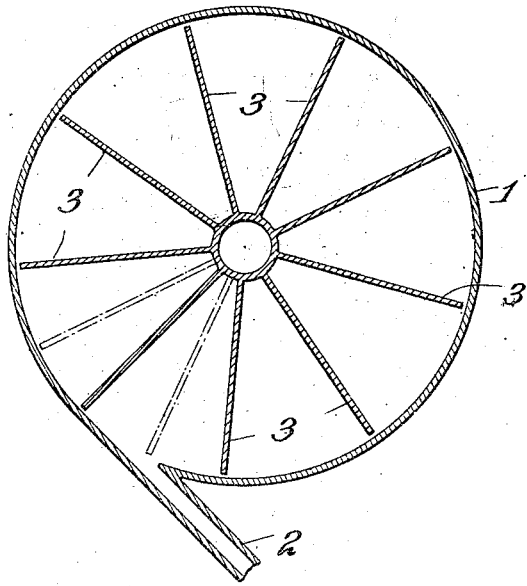
Figure 1 is a horizontal section taken through the inlet of a motor embodying my invention.
Figure 2:
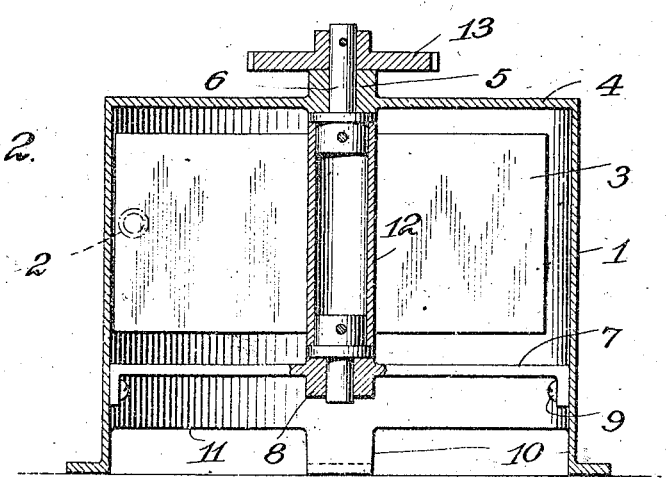
Fig. 2 is a vertical sectional view through the center of Fig. 1.

Referring to the drawing more in detail, 1 is a cylindrical casing preferably of light metal and having the inlet 2 arranged to point tangentially of the casing. When the axis of the casing 1 is vertical, the inlet 2 lies in a horizontal plane and is preferably placed slightly above the center of the space traversed by the vanes 3 of the wheel within the casing, although I do not wish to be limited to this arrangement.

The casing 1 is preferably provided with a top 4 in which is a bearing 5 for the shaft 6 of the wheel. Below the space traversed by the vanes 3 is a cross-bar 7 providing a bearing 8 for the lower end of the shaft 6, the bar 7 being secured to the casing by screws such as 9 or other suitable means.

In the present embodiment of my invention the axis of casing 1 is vertical and the lower edge of the casing is provided with downwardly projecting legs such as 10, forming a convenient support for the casing when in operation, whereby the motor may be conveniently placed in operation on the bottom of a sink or other horizontal surface. In case the casing of the motor is not provided with legs or feet at the lower edge thereof, it is necessary to set it over a drain pipe so that the water may flow away. In the form shown, however, the water may run out under the edge 11 of the casing between the legs 10.

It will be seen that the casing 1 is of the same internal diameter throughout, thus offering absolutely no impediment to the discharge of the water downwardly out of the way of the blades after the water has expended its energy on the blades.

The shaft 6 is shown as of composite construction comprising a hollow portion 12 and pintles connected to the part 12 by means of a head and pin construction, the said pintles running in bearings 5 and 8. At the upper end of the shaft I prefer to place a gear of suitable type, as indicated diagrammatically at 13. The vanes 3 are shown as integral with the portion 12 of the shaft. While the shaft construction just described is a convenient one, I do not wish to be limited thereto.

The vanes are preferably of light sheet metal and are preferably plane. The casing 1, moreover, incloses the ends of the blades or vanes 3 quite closely. In a motor having a casing with an inside diameter of about eight inches, I have obtained very good results when using a clearance of about one-eighth of an inch. It will be observed also that I make my blades quite long in the axial direction as compared to their radial dimension. With a blade of about three and one-half inches from shaft to vertical edge (when the shaft was vertical) I have obtained very good results when the blades or vanes were about two and one-half inches on their vertical edges. I prefer to use a large number of vanes and preferably an odd number. I have used eleven blades with very good results.

When using a motor made according to my invention and having a casing of about eight inches inside diameter, I have been able to freeze more than one quart of ice-cream, the motor being suitably geared to the freezer and giving about three to one reduction in speed. With the arrangement and freezer as just stated, and when operating with water from a domestic faucet, the single inlet of the motor being approximately one eighth of an inch in diameter, the motor continued to turn the freezer until the cream was frozen solid. I consider that I have thus demonstrated the high torque of my motor as compared to the amount of water used, and its capability for performing a wide range of work, since the freezer of course turned rapidly at first, but slowly at the end of the freezing operation. Moreover, the high torque needed to turn an ice-cream freezer until the cream is solid is well known, showing that the torque of my motor is especially high at low speeds as compared with previously known motors of like size and weight.

It will be obvious also that my motor is rugged and yet of light, cheap and simple construction.

While I have described one form of my invention, I do not wish to be limited thereto, but consider as within the scope of my invention all water motors mechanically equivalent to the form herein shown and described within the limits of my improvement over the prior art.

Having thus described my invention, I claim:

1. A vertical shaft water-motor having a cylindrical casing and an inlet thereto in a substantially horizontal plane, said inlet being directed to one side of the axis of the casing and being small both radially and axially as compared to the casing, the lower end of the casing being open and arranged to afford an unimpeded downward discharge, and a plurality of vanes substantially straight in the radial direction mounted to revolve in said casing and having relatively small clearance therewith.

2. A vertical shaft-water motor having a cylindrical casing and an inlet thereto in a substantially horizontal plane, said inlet being directed to one side of the axis of the casing and being small both radially and axially as compared to the casing, the lower end of the casing being open and arranged to afford an unimpeded downward discharge, a plurality of vanes substantially straight in the radial direction mounted to revolve in said casing and having relatively small clearance therewith, said vanes having an axial dimension which is a relatively large fraction of their radial dimension.

3. A vertical shaft water-motor having a cylindrical casing and an inlet thereto in a substantially horizontal plane, said inlet being directed to one side of the axis of the casing and being small both radially and axially as compared to the casing, the lower end of the casing being open and arranged to afford an unimpeded downward discharge, a plurality of vanes substantially straight in the radial direction mounted to revolve in said casing and having relatively small clearance therewith, said inlet being near the axial center of said vanes and near the periphery of the casing.

4. A water-motor having a cylindrical casing and an inlet thereto in a substantially horizontal plane, said inlet being directed to one side of the axis of the casing and being small both radially and axially as compared to the casing, one end of the casing being open and arranged to afford an unimpeded downward discharge, a plurality of vanes substantially straight in the radial direction mounted to revolve in said casing and having a relatively small clearance therewith, said vanes having an axial dimension which is a relatively large fraction of their radial dimension, and said inlet being near the axial center of said vanes and near the periphery of the casing.

5. A vertical shaft water-motor having a cylindrical casing and an inlet thereto in a substantially horizontal plane, said inlet being directed to one side of the axis of the casing and being small both radially and axially as compared to the casing, the lower end of the casing being open and arranged to afford an unimpeded downward discharge from the blade space, and a plurality of vanes mounted to revolve in said casing and having relatively small clearance therewith.

WALTER S. JONES.